United States Patent Office 2,753,310
Patented July 3, 1956

2,753,310

MANUFACTURE OF MOLYBDENUM-CONTAINING CATALYSTS

Fredrick J. Riedl, Cicero, Ill., assignor to Universal Oil Products Company, Chicago, Ill., a corporation of Delaware No Drawing. Application September 13, 1952, Serial No. 309,557

18 Claims. (Cl. 252—439)

This invention relates to the manufacture of molybdenum-containing catalysts by a novel and improved method.

Molybdenum catalysts have found varied utility in the treatment and conversion of organic compounds and particularly of hydrocarbons. For example, catalysts comprising alumina and molybdenum oxide have been utilized commercially for the dehydrogenation of saturated hydrocarbons and particularly for the reforming of gasoline or gasoline fractions to improve the octane number thereof. Further, catalysts comprising alumina-molybdenum oxide-cobalt oxide are particularly useful for effecting desulfurization of hydrocarbon fractions and especially gasoline fractions containing sulfur compounds. Still further, these catalysts may be utilized for effecting dehydrogenation, isomerization, etc., reactions of organic compounds and particularly of hydrocarbons.

Molybdenum-containing catalysts have been prepared by a number of different methods. The particularly preferred method in the past has been to introduce the molybdenum in the form of ammonium molybdate and to subsequently convert the ammonium molybdate to molybdenum oxide. While this method produces satisfactory catalysts, it has the disadvantage of evolving vapors of ammonia during the handling and subsequent working of the ammonium molybdate, and the resultant atmosphere of ammonia is objectionable to the operators of the plant or to other persons in the vicinity thereof. The present invention avoids these and other disadvantages in the manufacture of molybdenum-containing catalysts.

In one embodiment the present invention relates to a method of preparing a molybdenum-containing catalyst which comprises forming a mixture of a molybdenum compound and oxalic acid, and subsequently converting the same to molybdenum oxide.

In another embodiment the present invention relates to a method of preparing a supported molybdenum-containing catalyst which comprises forming a mixture of molybdic acid and oxalic acid, commingling said mixture with a support, and converting said mixture to molybdenum oxide.

In a specific embodiment the present invention relates to a method of preparing a catalyst comprising alumina, molybdenum oxide and cobalt oxide which comprises forming a mixture of molybdic acid and oxalic acid, commingling therewith cobalt nitrate, compositing the resultant mixture with alumina particles, and heating the same to form a catalyst comprising alumina, molybdenum oxide and cobalt oxide.

In still another specific embodiment, a halogen is composited with said alumina prior to commingling the alumina with the mixture of molybdic acid, oxalic acid and cobalt nitrate.

In still another specific embodiment the catalysts prepared in the above manner may be sulfided to form a final catalyst comprising alumina, molybdenum sulfide and cobalt sulfide, or alumina, halogen, molybdenum sulfide and cobalt sulfide.

It will be noted from the hereinbefore embodiments that a molybdenum compound and particularly molybdic acid is composited with oxalic acid, and the resultant mixture is subsequently converted to molybdenum oxide. In a preferred embodiment of the present invention, the molybdenum oxide is composited with a supporting material. When utilizing the preferred supporting materials, there is a coaction between the molybdenum compound and/or other components of the catalyst and the support. However, it is understood that any suitable support or supporting material may be used in accordance with the present invention and may include supports having catalytic activity per se, supports which, in association with the molybdenum compound or other components of the catalyst, exert a catalytic effect over and above that of the molybdenum compounds and other components, and supporting materials which serve merely as carriers for the active components of the catalyst and do not have catalytic activity per se.

Alumina is particularly preferred as the support because it appears to exert a peculiar influence, particularly when the catalyst also contains halogen, with the other components of the catalyst. Other supports include compounds and particularly the oxides of zirconium, zinc, titanium, magnesium, thorium, etc. When a halogen is not utilized, or when a halogen which will not react with silica to form a volatile silicon-halogen compound is used, the support may comprise silica. For most catalysts, the support to be used is preferably synthetically prepared and in many cases purified. However, in other cases, naturally occurring supporting materials may be satisfactory and thus may comprise naturally occurring clays, diatomaceous earth, feldspar, bauxite, etc., which may be acid or otherwise treated as desired. In some cases the support may comprise a mixture of two or more of the oxides hereinbefore set forth as, for example, composites of the oxides of aluminum and boron, aluminum and titanium, aluminum and silicon, aluminum and zirconium, aluminum, silicon and zirconium, aluminum and magnesium, aluminum, silicon and magnesium, zinc and zirconium, zinc and magnesium, etc. These multiple component supports may be synthetically prepared or naturally occurring as, for example, most naturally occurring clays contain a mixture of components. As hereinbefore set forth, the supports vary in their contribution to the total activity of the catalyst and therefore it is understood that the various supports which may be employed in accordance with the present invention are not necessarily equivalent.

Synthetically prepared alumina may be manufactured by the reaction of a suitable aluminum salt, such as aluminum chloride, aluminum sulfate, aluminum nitrate, aluminum acetate, etc. with a suitable alkaline reagent, such as ammonium hydroxide, ammonium carbonate, etc. to precipitate aluminum hydroxide. The aluminum hydroxide may be composited with one or more of the components of the catalyst while the aluminum hydroxide is in a wet state and either before or after washing thereof, or the aluminum hydroxide may be dried and formed into particles of uniform or irregular size and shape and then composited with one or more of the other components of the final catalyst. In another embodiment of the invention, the aluminum hydroxide may be formed into substantially spherical shaped particles in any suitable manner and then composited with the other components of the catalyst, either before or after drying of the aluminum hydroxide.

Supports comprising other oxides may be prepared in substantially the same manner as hereinbefore set forth in connection with the preparation of alumina, with the understanding that suitable modifications in the method of preparation will be made to suit the particular oxide desired. For example, silica gel may be prepared by the acidification of water glass or other suitable alkali metal silicate solutions, and the silica gel may be prepared either in substantially spherical shape by well known means or as wet cakes and subsequently formed into particles of uniform or irregular size and shape.

The wet cakes may be formed into particles of definite size and shape by first drying the wet hydroxide to remove a substantial proportion of the water therefrom and then forming into particles by suitable methods such as grinding, pelleting, extrusion, etc. Drying of the supporting material may be effected at any suitable temperature which generally will range from about 200° to 600° F. or more, and usually for a period of from about 2 to 24 hours or more. When the supporting material is to be calcined, it may be calcined at a temperature which generally will range from about 600° to 1400° F. or more, preferably at a temperature of from about 80° to about 1200° F., and usually for a period of from about 1 to 12 hours or more. The drying and/or calcination may be effected in the presence of air, a reducing atmosphere such as hydrogen, an inert atmosphere such as nitrogen, or a mixture thereof. In still another embodiment the catalyst may be calcined in a reducing atmosphere and then calcined in an oxidizing atmosphere, or the reverse procedure may be utilized.

In another preferred embodiment of the invention and particularly when a support is utilized in the final catalyst and still more particularly when the support comprises alumina, a halogen is included in the final catalyst. This catalyst is particularly advantageous for use in the treating of gasoline or gasoline fractions to remove undesirable impurities including those comprising sulfur compounds, nitrogen compounds, arsenic compounds, oxygen compounds, etc. and particularly mixtures thereof. Any suitable halogen may be employed and thus may comprise fluorine, chlorine, bromine and iodine. The halogen appears to exert a peculiar influence with the other components of the catalyst and thereby results in an improved catalyst for effecting the desired reactions. The exact state of the halogen in the catalyst has not been established, but the halogen is present in a combined state, probably in association with the support and/or other components of the catalyst, and this in turn results in an accentuated influence of the combined components on the other components of the catalyst.

The halogen may be added to the catalyst in any suitable manner and either before or after precipitation, drying, calcining and/or combining of the other components. In a preferred embodiment the halogen is added to the support, and the support containing the halogen is then formed into particles of definite size and shape before compositing with the other components of the catalyst. The halogen may be added in any suitable manner and, while the halogen may be utilized as such, it generally is preferred to utilize the same as an aqueous solution of the hydrogen halide for ease of handling. In another preferred embodiment, when the halogen comprises fluorine, it is added as an aqueous solution of an ammonium fluoride and particularly as an aqueous solution of ammonium bifluoride. Similarly, when the halogen comprises a halogen other than fluorine, it may be added as the ammonium halides thereof as, for example, ammonium chloride, ammonium bromide, etc. In still another embodiment, the halogen may be added as a metal halide salt when the salt is sufficiently soluble and the metal component either is desired in the final catalyst or is not objectionable therein.

In accordance with the present invention, the molybdenum is introduced into the catalyst as a complex of a molybdenum compound and particularly molybdic acid and oxalic acid. In preparing this complex, molybdic acid is commingled with oxalic acid in the desired proportions to form a liquid solution which will remain liquid without premature precipitation of molybdenum or other solids. In general, it is preferred to utilize substantially equimols of oxalic acid and of molybdic acid (calculated as Mo), although these proportions may be varied and comprise 1.1 or more mols of one component to one mol of the other component, providing the resultant mixture remains liquid without premature precipitation of solids during preparation, storing and handling of the complex solution. In general, these operations are preferably effected at an elevated temperature, usually not exceeding about 200° F., although it is understood that ambient temperature may be employed in some cases. Any suitable molybdic acid may be employed, including those available commercially which contain a small amount of ammonia, probably in chemical combination with the molybdic acid. In a preferred embodiment an aqueous solution of the oxalic acid is prepared, and the molybdic acid is commingled therewith and stirred until it is dissolved therein. While molybdic acid is the preferred source of molybdenum, it is understood that any other suitable source of molybdenum may be employed. For example, molybdenum oxides and particularly molybdenum trioxide may be utilized.

Oxalic acid appears to be unique in forming a molybdic acid-oxalic acid complex which will dissolve the molybdic acid and retain the same in solution, so that it may be successfully used in compositing with the other components of the catalyst. Furthermore, as will be hereinafter set forth, salts of other components as, for example, cobalt nitrate, may be composited with the molybdic-oxalic acid solution and still not encounter precipitation of solids. As mentioned above, this property of oxalic acid is unique and peculiar because other carboxylic acids either do not undergo sufficient ionization to form a solution of the molybdic acid, or if a solution is formed, precipitation of solids occurs, either from the solution or upon commingling therewith salts of cobalt, nickel and/or iron.

As hereinbefore set forth, a preferred embodiment of the present invention comprises a composite of a support and molybdenum oxide. In forming this composite, the molybdic acid-oxalic acid complex is commingled with the support, which may or may not contain halogen. In still another preferred embodiment of the present invention, the catalyst comprises a support, molybdenum oxide and an oxide of cobalt, nickel and/or iron. While the molybdic acid-oxalic acid complex may be composited with the support and then the cobalt, nickel and/or iron salts are subsequently added, a preferred embodiment is to commingle a suitable soluble salt of cobalt, nickel and/or iron with the molybdic acid-oxalic acid complex and then commingle the resultant mixture with the support. Any suitable soluble salt of cobalt, nickel and/or iron may be employed, a particularly preferred salt comprising the nitrate. Other soluble salts of cobalt include cobalt ammonium nitrate, cobalt ammonium chloride, cobalt ammonium sulfate, cobalt bromate, cobalt bromide, cobalt chloride, cobalt chlorate, cobalt fluosilicate, cobalt iodide, cobalt potassium sulfate, etc. Soluble salts of nickel include nickel ammonium nitrate, nickel ammonium sulfate, nickel bromide, nickel chloride, nickel fluosilicate, nickel iodide, nickel nitrate, nickel nitrate ammonia, nickel sulfate, etc. Soluble iron salts include iron ammonium sulfate, ferric bromide, ferrous bromide, ferric chloride, ferrous chloride, ferric nitrate, ferrous nitrate, etc. It is understood that these various salts are not necessarily equivalent.

The solution of molybdic acid-oxalic acid complex or the solution of molybdic acid-oxalic acid complex and other component or components may be composited with the support in any suitable manner. In one embodiment, preformed particles of the support are soaked in the solution, excess solution drained, and the oxides developed by heating, preferably in the presence of air. In another embodiment, the molybdic acid-oxalic acid complex or this complex containing the other components may be admixed with the support before the latter had been dried and then heated to devlop the metal oxides. It is understood that any suitable method of compositing the solution with the support may be employed and that the mixing and working of these preparations preferably is effected at an elevated temperature which, as hereinbefore set forth, generally will not be above about 200° F.

The various components of the catalyst will be composited in proportions to form a final catalyst containing the deseired concentartions thereof. In general it is preferred that each component be added at one time in the amount desired in the final catalyst, although it is understood that one or more of the components may be added in incremental amounts when such procedure is desired. Regardless of the method of commingling the components, the composite is heated to develop the oxide of molybdenum, or the oxides of molybdenum, cobalt and/or other metals. Any suitable temperature to accomplish this may be employed, which temperature in general will be in a range of from about 500° F. to 1200° F. or more and preferably of from about 700° to about 1000° F. The time of heating will be sufficient to effect the desired development of the oxides and may range, for example, from about 1 hour or less to 10 hours or more. Preferably the heating is effected in the presence of perfluent air or other oxygen-containing gas.

In another preferred embodiment, the catalyst comprises alumina, molybdenum sulfide and cobalt sulfide and particularly this composite containing halogen. This catalyst is readily obtained by sulfiding the composite containing the oxides. The sulfiding may be accomplished in any suitable manner. In one method the sulfiding may be effected by passing hydrogen sulfide through the composite, preferably at an elevated temperature which may range from about 500° to about 1000° F. or more for a time sufficient to effect substantially complete sulfidation, which can be determined by continuing the treatment until there is no further absorption of hydrogen sulfide. In another embodiment, the composite containing the oxides may be utilized at an elevated temperature for the treatment of a hydrocarbon or other fraction, particularly a gasoline fraction, containing sulfur compounds, and thereby convert the oxides to the sulfides in situ.

As hereinbefore set forth, a particularly preferred catalyst for the treatment of gasoline or gasoline fractions containing undesired impurities, including those containing compounds of sulfur, nitrogen, oxygen and arsenic, comprises a composite of alumina, molybdenum oxide and cobalt oxide, and still more particularly alumina, halogen, molybdenum oxide and cobalt oxide. In still another embodiment these components are sulfided in order to form catalysts containing the sulfides of molybdenum and cobalt.

The concentrations of the various components in the catalyst will vary considerably depending upon the particular catalyst desired. A catalyst comprising molybdenum oxide-cobalt oxide, molybdenum oxide-nickel oxide or molybdenum oxide-iron oxide, or catalysts comprising the corresponding sulfides may contain the molybdenum and other components in equal weight proportions or proportions varying from 20 parts by weight of one to 1 part by weight of the other component. Catalysts comprising molybdenum oxide and mixtures of cobalt oxide, nickel oxide and/or iron oxide, or catalysts comprising the corresponding sulfides thereof, may contain one part by weight of molybdenum for each one part by weight total of the other components, or each component may be present in equal parts, or each component may be present in different concentrations which may range to 20 or more parts of one component to one or more parts of the other components.

Preferred catalysts comprise a support, molybdenum oxide and cobalt oxide or the sulfides of the last two oxides. In these catalysts the support preferably comprises a major proportion of the catalyst and the molybdenum (calculated as Mo) and the cobalt (calculated as Co) each may comprise from about 1 to about 25% by weight of the final composite. The atomic proportions of molybdenum (Mo) to cobalt (Co) may be equal or may range up to 20 or more atomic proportions of one component to 1 proportion of the other.

As hereinbefore set forth, a particularly preferred catalyst comprises alumina, combined halogen and the oxides or sulfides of molybdenum and cobalt. In these catalyst the alumina preferably comprises a major proportion of the composite and may range from about 50% to about 90% or more by weight of the final catalyst. The molybdenum (calculated as Mo) and cobalt (calculated as Co) may be present in concentrations of from about 1 to about 25% by weight of each, and these may be in atomic proportions of 20 or more proportions of one component to 1 proportion of the other. A particularly preferred composite contains substantially equal atomic ratios of the molybdenum and cobalt and, in this embodiment, the molybdenum preferably is present in a concentration of from about 3% to 10% by weigth and the cobalt is present in a concentration of from about 1% to about 5% by weight. In another preferred embodiment the molybdenum is present in an atomic ratio to cobalt of 3:1 to 5:1. The halogen may be present in a concentration of from about 0.01% to about 20% or more by weight of the final catalyst and preferably is present in a concentration of from about 1% to about 10% by weight thereof. It is understood that the various halogens are not necessarily equivalent and that the concentrations thereof to be used will depend upon the particular halogen employed. It also is understood that a mixture of two or more halogens may be utilized, including particularly a mixture of fluorine and chlorine.

The catalysts of the present invention are particularly suitable for the treatment of organic compounds and especially hydrocarbons. Still more particularly these catalysts are of advantage for use in the treatment of gasoline or gasoline fractions containing undesirable impurities. The treatment of gasoline or gasoline fractions generally is effected in the presence of hydrogen at temperatures of from about 500° to about 800° F., although in some cases higher temperatures up to 850–900° F. may be employed. Atmospheric and preferably superatmospheric pressures ranging from 50 to 5000 pounds per square inch or more may be utilized. This treatment will serve to remove impurities containing sulfur, nitrogen, oxygen and arsenic from the gasoline or gasoline fraction and thereby is particularly suitable for treatment of gasoline or gasoline fractions prior to reforming of the gasoline in contact with a reforming catalyst containing a noble or expensive metal, in order to avoid the deleterious effects of these impurities on the reforming catalyst. Similarly, the catalyst of the present invention may be used for the treatment of the other hydrocarbon fractions in order to remove undesirable impurities as, for example, the treatment of aromatic solvents, kerosene, etc.

The catalyst of the present invention also may find utility for other conversion reactions of organic compounds and particularly hydrocarbons, including reforming of gasoline, dehydrogenation of normally gaseous or normally liquid hydrocarbons, isomerization of organic hydrocarbons, non-destructive hydrogenation of unsaturated hydrocarbons, hydrogen transfer reactions, alkyl reactions, polymerization reactions, etc. Dehydrogenation and reforming reactions generally are effected at temperatures of from about 800° to 1200° F. or more, while non-destructive hydrogenation reactions generally are effected at temperatures of from about 300° to about 800° F. The various reactions hereinbefore set forth may be effected in the presence of hydrogen when required or of advantage.

The following examples are introduced to illustrate further the novelty and utility of the present invention, but not with the intention of unduly limiting the same.

Example I

A catalyst was prepared to contain approximately 86% by weight of alumina, 0.3% by weight of combined fluorine (calculated as F), 8.5% by weight of molybdenum (calculated as Mo) and 5.2% by weight of cobalt (calculated as Co). This catalyst was prepared as follows.

39.15 grams of oxalic acid dihydrate were dissolved in 75 ml. of water at 140° F. 52.65 grams of molybdic acid (commercial CP, 85% MoO₃) were dissolved in the oxalic acid solution. 89.9 grams of melted cobalt nitrate hexahydrate were mixed with the solution and sufficient water was added to equal 180 ml.

Alumina pills were prepared by commingling ammonium hydroxide with aluminum chloride to form aluminum hydroxide. During the final washing and filtering of the aluminum hydroxide, sufficient hydrogen fluoride solution was commingled to form a composite containing about 0.3% by weight of fluorine. The aluminum hydroxide-halogen composite was dried, formed into cylindrical pills, and calcined at a temperature of about 1200° F.

60 ml. of the molybdic acid-oxalic acid-cobalt nitrate solution were added to 100 grams of the alumina-halogen pills and allowed to stand for about 20 minutes, after which excess solution was drained and the pills were then dried, calcined for two hours in perfluent air at 770° F., and finally sulfided at 770° F. in perfluent hydrogen sulfide.

The molybdic acid-oxalic acid solution remained liquid without precipitation of solids. Furthermore, the cobalt nitrate readily dissolved in this solution, and the resultant solution remained liquid without precipitation of solids. The soluton was then readily impregnated on the alumina pills to form a catalyst having the compositions hereinbefore set forth and containing the impregnating solution uniformly distributed on and within the alumina-halogen pills.

Example II

The catalyst as prepared in the above manner was utilized for the hydrodesulfurization of a heavy catalytic cycle oil obtained in the cracking of a Mid-Continent gas oil in the presence of a silica-alumina cracking catalyst. This heavy cycle oil had an A. P. I. gravity at 60° F. of 24.9°, a bromine number of 18.3, an aromatic+olefin content of 39.5%, a sulfur content of 0.52% by weight, and a boiling range of from 450° F. to above 771° F. This cycle oil was subjected to treatment with the catalyst at a temperature of about 770° F., a pressure of 800 pounds per square inch and a liquid hourly space velocity (defined as the volumes of oil per hour per volume of catalyst in the reaction zone) of 1.06, in the presence of hydrogen in an amount of 1890 cubic feet per barrel of oil.

By treatment in the above manner the sulfur content of the cycle oil was reduced to 0.08% by weight and the bromine number was reduced to 12.9. It will be noted that approximately 85% desulfurization was effected and, at the same time, hydrogenation of olefins was also effected.

Example III

Another batch of catalysts was prepared in substantially the same manner as described in Example I, utilizing oxalic acid dihydrate. This catalyst was utilized for the desulfurization of a Mid-Continent naphtha having an A. P. I. gravity of 60° F. of 52.7, a boiling range of from 210° F. to 420° F., and a sulfur content of 0.04% by weight. This naphtha had been caustic washed to remove most of the mercaptans and hydrogen sulfide, and then was treated with the catalyst of the present invention in order to further reduce the sulfur content thereof.

Treatment of the naphtha was effected at an average temperature of 735° F., a pressure of 800 pounds per square inch, a liquid hourly space velocity of about 5 and in the presence of hydrogen in an amount of 245 cubic feet per barrel of naphtha. This treatment served to reduce the sulfur content of the naphtha to 0.0027% by weight.

Example IV

Another sample of the catalyst described in Example III was utilized for the hydrodesulfurization of a California naphtha having a A. P. I. gravity at 60° F. of 47.1, a boiling range of from 272° F. to 361° F., and a sulfur content of 0.141% by weight. This treatment was effected at an average temperature of 600° F., a pressure of about 800 pounds per square inch, a liquid hourly space velocity of 5 and in the presence of 245 cubic feet of hydrogen per barrel of naphtha. This treatment served to reduce the sulfur content of naphtha to 0.0079% by weight.

Example V

Another portion of the catalyst prepared in accordance with Example III was utilized for the treatment of a California coker distillate having a specific gravity at 60° F. of 50.7, a boiling range of from 150° to 404° F., a bromine number of 67 and a sulfur content of 2.61%. This treatment was effected at 750° F., 810 pounds per square inch, a liquid hourly space velocity of two and hydrogen in an amount of 480 cubic feet per barrel of oil. This treatment served to reduce the bromine number of the coker distillate to 6.8 and the sulfur content to 0.16% by weight.

Example VI

This catalyst was prepared to contain about 92% by weight of alumina, about 0.3% by weight of combined fluorine (calculated as F), about 3% by weight of molybdenum (calculated as Mo) and about 5% by weight of cobalt (calculated as Co). The catalyst was prepared by dissolving 4.35 grams of oxalic acid dihydrate in 8 ml. of water at 140° F. and dissolving therein 5.85 grams of molybdic acid (commercial CP, 85% MoO₃). 40 ml. of a solution containing 9.99 grams of cobalt nitrate hexahydrate was added, and the total solution was then impregnated on and within 100 grams of another batch of the alumina-halogen pills described in Example I. The pills then were dried for 1 hour at 212° F., calcined for 2 hours at 800° F. in perfluent air, and sulfided for about one-half hour at 500° F. in perfluent hydrogen sulfide.

The catalyst as prepared in the above manner may be utilized for the desulfurization and hydrogenation of an aromatic solvent containing sulfur and olefinic compounds in small and undesired amounts. This treatment may be effected at a temperature of 900° F., a pressure of 500 pounds per square inch and in the presence of hydrogen in an amount of 400 cubic feet of hydrogen per barrel of aromatic solvent. This treatment will serve to reduce the sulfur and olefinic content of the aromatic solvent and thereby permit it to pass commercial specifications.

Example VII

A catalyst is prepared to comprise alumina, 3% by weight of fluorine (calculated as F), 7% by weight of molybdenum (calculated as Mo) and 2% by weight of nickel (calculated as Ni). This catalyst is prepared through the use of oxalic acid in substantially the same manner as hereinbefore set forth.

This catalyst may be utilized for the purification of a Mid-Continent straight run naphtha containing sulfur compounds, nitrogen compounds, oxygen compounds and arsenic compounds. The treatment may be effected at a temperature of 750° F., a pressure of 500 pounds per square inch and in the presence of hydrogen in an amount of 600 cubic feet per barrel of naphtha. This treatment will serve to effectively reduce these impurities from the naphtha and thereby will provide a treated naphtha which may be subjected to reforming in the presence of hydrogen and a catalyst comprising alumina, combined halogen and platinum, at a temperature of 920 F. and a pressure of 500 pounds per square inch.

*Example VIII*

A catalyst comprising zirconia, 10% by weight of molybdenum (calculated as Mo), 10% by weight of cobalt (calculated as Co) and 3% by weight of fluorine (calculated as F) may be prepared by precipitating zirconia from zirconium sulfate by commingling ammonium hydroxide therewith. The zirconia is washed to remove soluble impurities, an ammonium bifluoride solution is added in an amount to prepare a final catalyst containing 3% by weight of fluorine. Molybdic acid, oxalic acid and cobalt chloride are then added in amounts to form a final catalyst having the proportions hereinbefore set forth. The composite is then dried at 300° F. for 12 hours, formed into cylindrical pellets in a conventional pelleting operation, and then calcined at 900° F. for 6 hours.

The catalyst as prepared in the above manner may be utilized for the reforming of a Mid-Continent straight run naphtha at a temperature of 950° F. and a pressure of 500 pounds per square inch in the presence of hydrogen in a ratio of 4 mols of hydrogen to 1 mol of hydrocarbon.

I claim as my invention:

1. A method of preparing a supported molybdenum-containing catalyst which comprises forming an aqueous solution of oxalic acid and a molybdenum compound selected from the group consisting of molybdic acid and molybdenum oxides, commingling said solution with a solid support, and heating the thus impregnated support to form molybdenum oxide.

2. A method of preparing a supported molybdenum-containing catalyst which comprises forming an aqueous solution of molybdic acid and oxalic acid, commingling said solution with a solid support, and heating the thus impregnated support to form molybdenum oxide.

3. A method of preparing a catalyst which comprises forming an aqueous solution of molybdic acid and oxalic acid, commingling said solution with solid particles of alumina, and heating the thus impregnated particles to form molybdenum oxide.

4. The method of claim 3 further characterized in that combined halogen is introduced to the alumina prior to the commingling of said solution therewith.

5. The method of claim 4 further characterized in that said halogen comprises fluorine.

6. The method of claim 3 further characterized in that there is added to said solution a soluble salt of a metal selected from the group consisting of cobalt, nickel and iron.

7. The method of claim 3 further characterized in that cobalt nitrate is added to the solution of molybdic acid and oxalic acid prior to commingling the same with the alumina.

8. The method of claim 3 further characterized in that said catalyst is sulfided to convert the molybdenum oxide to molybdenum sulfide.

9. A method of preparing a catalyst comprising alumina, molybdenum oxide and cobalt oxide, which comprises forming an aqueous solution of molybdic acid and oxalic acid, commingling therewith cobalt nitrate, compositing the resultant mixture with solid alumina particles, and heating the same in the presence of air to form a catalyst comprising alumina, molybdenum oxide and cobalt oxide.

10. A method of preparing a catalyst comprising alumina, molybdenum sulfide and cobalt sulfide, which comprising forming an aqueous solution of molybdic acid and oxalic acid, commingling therewith cobalt nitrate, compositing the resultant mixture with solid alumina particles, heating the composite to convert said mixture to the oxides, and sulfiding the same to form a catalyst comprising alumina, molybdenum sulfide and cobalt sulfide.

11. The method of claim 10 further characterized in that the molybdenum sulfide (calculated as Mo) and cobalt sulfide (calculated as Co) each comprise from about 1 to about 25% by weight of the final catalyst.

12. A method of preparing a catalyst comprising alumina, halogen, molybdenum oxide and cobalt oxide, which comprises forming solid particles of alumina containing halogen, separately forming an aqueous solution of molybdic acid and oxalic acid, commingling therewith cobalt nitrate, compositing the resultant mixture with said solid particles, and heating the same in the presence of air to form a catalyst comprising alumina, combined halogen, molybdenum oxide and cobalt oxide.

13. A method of preparing a catalyst comprising alumina, halogen, molybdenum sulfide and cobalt sulfide, which comprises forming solid particles of alumina containing halogen, separately forming an aqueous solution of molybdic acid and oxalic acid, commingling therewith cobalt nitrate, compositing the resultant mixture with said solid particles, heating the composite to convert said mixture to the oxides, and sulfiding the same to form a catalyst comprising alumina, combined halogen, molybdenum sulfide and cobalt sulfide.

14. The process of claim 13 further characterized in that said molybdenum sulfide (calculated as Mo) and cobalt sulfide (calculated as Co) each comprise from about 1 to about 25% by weight of the final catalyst, and said halogen comprises from about 1 to about 20% by weight of the final catalyst.

15. A method of preparing a catalyst comprising alumina, halogen, molybdenum oxide and nickel oxide, which comprises forming solid particels of alumina containing halogen, separately forming an aqueous solution of molybdic acid and oxalic acid, commingling therewith nickel nitrate, compositing the resultant mixture with said solid particles, and heating the same in the presence of air to form a catalyst comprising alumina, combined halogen, molybdenum oxide and nickel oxide.

16. A method of preparing a catalyst comprising alumina halogen, molybdenum oxide and iron oxide, which comprises forming solid particles of alumina containing halogen, separately forming an aqueous solution of molybdic acid and oxalic acid, commingling therewith iron nitrate, compositing the resultant mixture with said solid particles, and heating the same in the presence of air to form a catalyst comprising alumina, combined halogen, molybdenum oxide and iron oxide.

17. A method of preparing a catalyst comprising alumina, halogen and molybdenum oxide, which comprises forming solid particles of alumina containing halogen, separately forming an aqueous solution of molybdic acid and oxalic acid, commingling said solution with said solid particles, and heating the same in the presence of air to convert the molybedic acid to molybdenum oxide.

18. A method of preparing a catalyst comprising alumina, halogen and molybdenum sulfide which comprises forming solid particles of alumina containing halogen, separately forming an aqueous solution of molybdic acid and oxalic acid, commingling said solution with said solid particles, heating the composite to form molybdenum oxide, and sulfiding the same to form a catalyst comprising alumina, combined halogen and molybdenum sulfide.

References Cited in the file of this patent

UNITED STATES PATENTS

| | | |
|---|---|---|
| 2,322,622 | Fischer et al. | June 22, 1943 |
| 2,369,734 | Heard | Feb. 20, 1945 |
| 2,499,255 | Parker | Feb. 28, 1950 |